(12) United States Patent
Kim et al.

(10) Patent No.: US 9,722,262 B2
(45) Date of Patent: Aug. 1, 2017

(54) FUEL CELL STACK FOR PREVENTING DETERIORATION OF END CELL

(71) Applicant: Hyundai Motor Company, Seoul (KR)

(72) Inventors: Jong Sung Kim, Gyeonggi-do (KR); Jae Jun Ko, Gyeonggi-do (KR); Jung Do Suh, Seoul (KR)

(73) Assignee: Hyundai Motor Company, Seoul (KR)

( * ) Notice: Subject to any disclaimer, the term of this patent is extended or adjusted under 35 U.S.C. 154(b) by 160 days.

(21) Appl. No.: 13/896,576

(22) Filed: May 17, 2013

(65) Prior Publication Data

US 2014/0186738 A1    Jul. 3, 2014

(30) Foreign Application Priority Data

Dec. 28, 2012  (KR) .......................... 10-2012-0155828

(51) Int. Cl.
 *H01M 8/04082* (2016.01)

(52) U.S. Cl.
 CPC .... *H01M 8/04201* (2013.01); *H01M 2250/20* (2013.01); *Y02T 90/32* (2013.01)

(58) Field of Classification Search
 CPC .............................. H01M 8/245; H01M 8/242
 See application file for complete search history.

(56) References Cited

U.S. PATENT DOCUMENTS

2010/0167146 A1*  7/2010  Takeguchi et al. .......... 429/432

FOREIGN PATENT DOCUMENTS

| CN | 1875514 A | 12/2006 |
|---|---|---|
| CN | 101322274 A | 12/2008 |
| CN | 101371388 A | 2/2009 |
| JP | 2005203228 A | 7/2005 |
| JP | 2005251635 A | 9/2005 |
| JP | 2007-026356 A | 2/2007 |
| JP | 2008181783 A | 8/2008 |
| KR | 10-2012-0051556 | 5/2012 |

OTHER PUBLICATIONS

JP2007026856A Original & Translation form Espacenet.*

* cited by examiner

*Primary Examiner* — Barbara Gilliam
*Assistant Examiner* — Nathanael Zemui
(74) *Attorney, Agent, or Firm* — Mintz Levin Cohn Ferris Glovsky and Popeo, P.C.; Peter F. Corless

(57) ABSTRACT

A fuel cell stack preventing deterioration of an end cell, which has a structure for preventing cooling of a neighbor cell adjacent to a closed end plate, is provided. To this end, an open end plate and a closed end plate, which are provided on a first side and a second side, respectively, of the fuel cell stack, fasten a plurality of working cells together. More specifically, a hollow flow space is formed in an inner wall of the closed end plate to form an air pocket therein.

3 Claims, 5 Drawing Sheets

Enlarged view of "A"

FUEL CELL STACK FOR PREVENTING DETERIORATION OF END CELL

CROSS-REFERENCE TO RELATED APPLICATION

This application claims under 35 U.S.C. §119(a) the benefit of Korean Patent Application No. 10-2012-0155828 filed Dec. 28, 2012, the entire contents of which are incorporated herein by reference.

BACKGROUND (a) Technical Field

The present invention relates to a fuel cell stack that prevents deterioration of an end cell. More particularly, the present invention relates to a fuel cell stack that prevents deterioration of an end cell, which has a structure for preventing cooling of a neighbor cell adjacent to a closed end plate.

(b) Background Art

A fuel cell stack is a kind of generating device that generates electricity as a major energy source of a fuel cell vehicle and has a structure in which an anode to which hydrogen is supplied and a cathode to which oxygen is supplied are stacked with a membrane electrode assembly interposed therebetween such that oxygen-containing air and externally supplied hydrogen chemically react with each other to generate electrical energy.

In general, a fuel cell stack is configured in such a manner that several tens to several hundreds of unit cells are stacked. The configuration of a unit cell of the fuel cell stack will be described below. More specifically, a membrane electrode assembly (MEA) is positioned in the center of a unit cell. The membrane electrode assembly includes a polymer electrolyte membrane capable of transporting hydrogen ions (protons) and a cathode electrode (catalyst) and an anode electrode (catalyst), which are stacked on both sides of the electrolyte membrane such that hydrogen and oxygen react with each other. Moreover, a gas diffusion layer (GDL) is stacked on the outside of each of the cathode electrode and the anode electrode, and a separator in which flow fields are formed to supply fuel and discharge water produced by a reaction is stacked on the outside of the gas diffusion layer.

Furthermore, after several tens to several hundreds of unit cells are stacked, an end plate for supporting and fixing the respective components is connected to both outermost sides as schematically shown in FIG. 1, thus completing the fuel cell stack. Here, the end plate serves as a support for fastening of the fuel cell stack and a transfer path of generated electricity. The end plate is typically made of plastic and metal.

As shown in FIG. 1, when several hundreds of unit cells of a fuel cell stack 10 are stacked, a dummy cell 14 is stacked in a position adjacent to a closed end plate 22 other than working cells 12 in which an electricity generation reaction takes places. Also, a supply manifold 16 is formed on one side vertically in the stacked direction of the working cells 12 and the dummy cell 14, and a discharge manifold 18 is formed on the other side vertically.

In particular, as shown in FIG. 1, the end plate on one side is configured as a closed end plate 22 with a closed structure, and the end plate on the other side is configured as an open end plate in which an inlet path 26 for introducing hydrogen, air, and coolant is formed in an upper end and an outlet path 28 for discharge of unreacted gas and coolant is formed in a lower end.

In general, the fuel (hydrogen and air) and coolant supplied to the fuel cell stack sequentially pass through the open end plate 24, the supply manifold 16, the working cells 12, the discharge manifold 18, and the open end plate 24 again and is then discharged to the outside of the fuel cell stack. In detail, the hydrogen is supplied to the anode through the inlet path 26 of the open end plate 24, the air (oxygen) is supplied to the cathode, and the coolant for cooling is supplied to a coolant flow field of the separator also through the inlet path 26 of the open end plate 24.

Accordingly, at the anode of the fuel cell stack, an oxidation reaction of hydrogen occurs to produce hydrogen ions (protons) and electrons, and the produced hydrogen ions and electrons are transmitted to the cathode through the polymer electrolyte membrane and the separator. At the cathode, the hydrogen ions and electrons transmitted from the anode react with the oxygen-containing air to produce water. At the same time, electrical energy is generated by the flow of electrons.

Meanwhile, the fuel (hydrogen and air) supplied to the fuel cell stack should be humidified to maintain the performance of the membrane, and thus when the humidified fuel supplied to the fuel cell stack passes through the supply manifold, condensed water is produced due to a low ambient temperature. Here, the produced condensed water is introduced into the fuel cell stack along the wall of the flow field together with the fuel, and the performance and durability of the cells into which the condensed water is introduced are degraded as a result, which may be caused by catalyst deterioration due to the continued presence of water around the catalyst.

Moreover, the cells adjacent to the end plates 22 and 24 have a temperature lower than that of other cells due to cooling from external environments through the end plates 22 and 24. In particular, the cell adjacent to the closed end plate 22 is further cooled, when the fuel and coolant hit the inside wall of the closed end plate 22, and thus has a much lower temperature. The low temperature of the cells increases the production of condensed water in the cells, which causes the deterioration of the fuel cell stack.

Conventionally, to solve this problem, as shown in FIG. 1, the dummy cell 14 (i.e., a non-reaction cell that does not generate electricity but serves as a discharge path of condensed water) is provided in a position adjacent to the closed end plate 22, but its effect is insignificant. As a result, the deterioration of durability performance continuously occurs in the cell adjacent to the closed end plate 22. Accordingly, a dummy cell may be further provided in a position adjacent to the closed end plate 22 to prevent the deterioration of durability performance due to cell cooling but, in this case, various problems such as a reduction in output, an increase in manufacturing cost, an increase in weight, etc. occur due to the additional application of the dummy cell.

The above information disclosed in this Background section is only for enhancement of understanding of the background of the invention and therefore it may contain information that does not form the prior art that is already known in this country to a person of ordinary skill in the art.

SUMMARY OF THE DISCLOSURE

The present invention provides a fuel cell stack for preventing deterioration of an end cell, which can prevent cooling of a neighbor cell adjacent to a closed end plate and cause an increase in temperature by forming a flow space that provides a heat-insulating effect through an air pocket on an inside wall of the closed end plate.

In one aspect, the present invention provides a fuel cell stack for preventing deterioration of an end cell, the fuel cell stack including an open end plate and a closed end plate, which are provided on one side and the other side of the fuel cell stack to fasten a plurality of working cells. A hollow flow space is formed on an inside wall of the closed end plate adjacent to the dummy cell.

In an exemplary embodiment, the flow space is formed in a position facing an end of a supply manifold adjacent to the closed end plate.

In another exemplary embodiment, the closed end plate and the working cell are adjacent to each other with a dummy cell interposed therebetween, and a sub-gasket in the dummy cell has a closed plate structure including micro-holes.

In still another exemplary embodiment, the micro-holes are formed in positions facing the end of the supply manifold and an end of a discharge manifold adjacent to the closed end plate, respectively.

Other aspects and exemplary embodiments of the invention are discussed infra.

BRIEF DESCRIPTION OF THE DRAWINGS

The above and other features of the present invention will now be described in detail with reference to certain exemplary embodiments thereof illustrated the accompanying drawings which are given hereinbelow by way of illustration only, and thus are not limitative of the present invention, and wherein.

Figure 1:
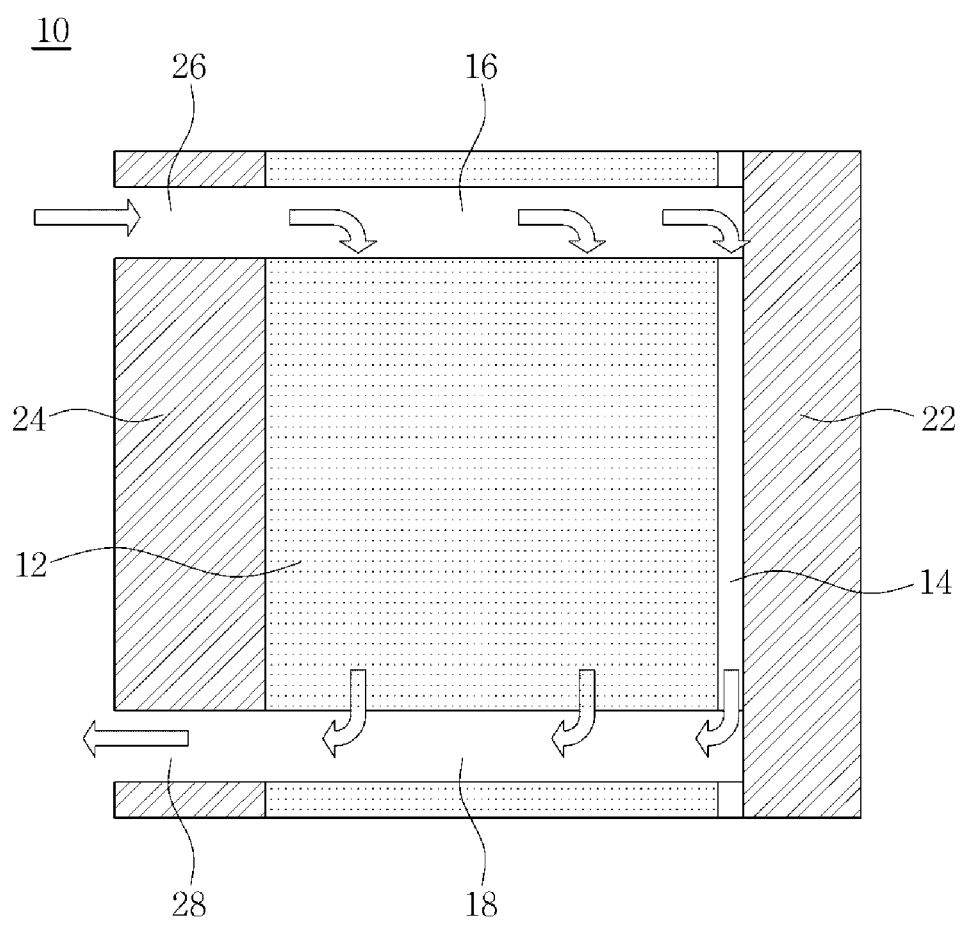
FIG. 1 is a schematic cross-sectional view showing the structure of a conventional fuel cell stack.

Reference numerals set forth in the Drawings includes reference to the following elements as further discussed below:

| | |
|---|---|
| 10: fuel cell stack | 12: working cell |
| 14: dummy cell | 16: supply manifold |
| 18: discharge manifold | 20: sub-gasket for dummy cell |
| 22: closed end plate | 24: open end plate |
| 26: inlet path | 28: outlet path |
| 30: flow space | 32: micro-hole |

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Hereinafter reference will now be made in detail to various embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

The present invention provides a fuel cell stack that prevents deterioration of an end cell, in which a flow space is formed on an inside wall of a closed end plate to prevent cooling of fuel and coolant when the fuel and coolant introduced through a supply manifold comes in contact with the inside wall of the closed end plate and a sub-gasket without manifold flow holes is further applied to a dummy cell adjacent to the closed end plate to maintain an air pocket formed in the flow space even in the event of a change in the flow of fuel.

Figure 2:
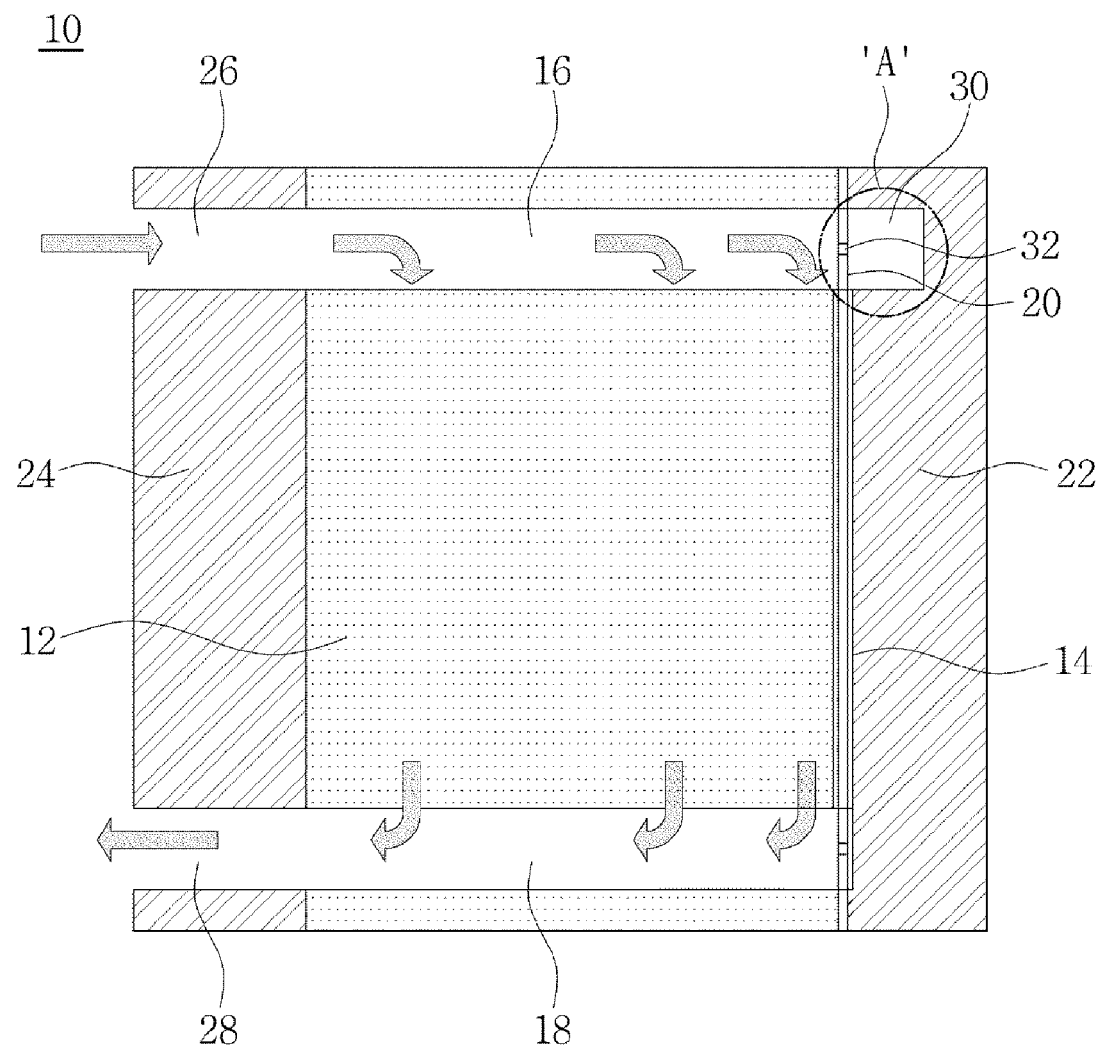
FIG. 2 is a schematic cross-sectional view showing the structure of a fuel cell stack according to an exemplary embodiment of the present invention.

In FIG. 2, a cross-sectional structure of a fuel cell stack according to the exemplary embodiment of the present invention is schematically shown. As shown in FIG. 2, in a state where a plurality of working cells 12, in which an electricity generation reaction takes place, are stacked in a fuel cell stack 10, a closed end plate 22 with a closed structure is fastened to one side, and an open end plate 24 is fastened to the other side, and although not shown in the figure, the closed end plate 22 and the open end plate 24 are fastened by a separate bending or clamping means (e.g., a clamp, or other fastening structure) to provide and maintain a fastening surface pressure for the working cells 12.

Here, in the open end plate 24, an inlet path 26 for introducing fuel and coolant is formed in an upper end and an outlet path 28 for discharge of unreacted gas and coolant from the working cells 12 is formed in a lower end. A supply manifold 16 and a discharge manifold 18, which are formed on the top and bottom of the working cells 12, respectively, represent manifolds of separators stacked together through a sub-gasket and include a supply manifold and a discharge manifold for air, hydrogen, and coolant, respectively.

In the exemplary embodiment of the present invention, a hollow flow space 30 is formed in the closed end plate 22 to prevent cooling of fuel and coolant when the fuel and coolant introduced into the fuel cell stack 10 through the supply manifold 16 come in contact the inside wall of the closed end plate 22.

As shown in FIG. 2, the closed end plate 22 includes a flow space 30 formed to a predetermined depth on the inside wall adjacent to the dummy cell 14, the flow space 30 being provided on the opposite side of the inlet path 26, i.e., in a position facing the end of the supply manifold 16. In other words, the flow space 30 is an extension line of the supply manifold 16. This flow space 30 is used to prevent cooling of fuel and coolant when the fuel and coolant introduced through the inlet path 26 of the open end plate 24 form coming in contact with the inside wall of the closed end plate 22 to prevent cooling of the working cells 12 adjacent to the closed end plate 22, i.e., neighbor cells including an end cell, thus causing an increase in temperature of the cells. Here, from the analysis of fuel flow velocity distribution in the fuel cell stack 10, it was found that that an air pocket where almost no flow velocity was detected was formed in the flow space 30.

Figure 3:
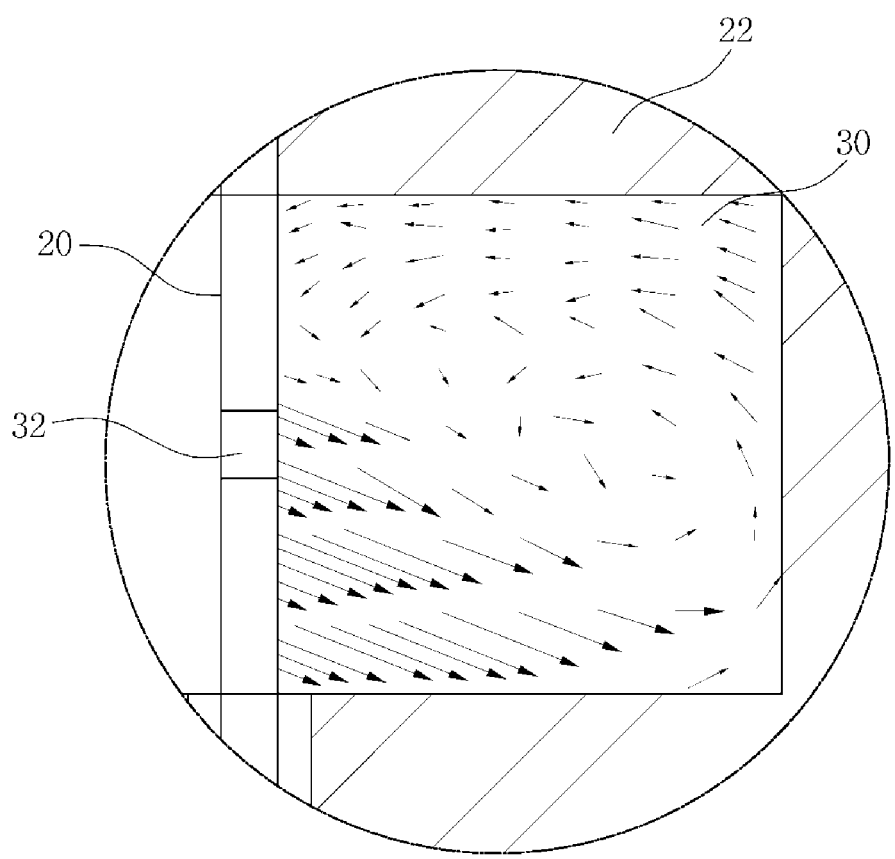
FIG. 3 is an enlarged view of "A" in FIG. 2, showing an air pocket formed in a flow space of a closed end plate.

FIG. 3 is an enlarged view of "A" in FIG. 2, showing the flow of fuel and coolant in the flow space 30 of the closed end plate 22. As shown in FIG. 3, the fluid creates a rotating flow in the flow space 30 in the closed end plate 22, and the fluid flows with almost no velocity into the flow space 30 to form an air pocket, thus obtaining a heat-insulating effect through the air pocket formed in the above manner. Accordingly, it is possible to increase the heat-insulating performance of the neighbor cells including the end cell adjacent to the closed end plate 22. As such, it is possible to cause an increase in temperature of the working cell 12 adjacent to the closed end plate 22 due to the air pocket in the flow space 30, and thus it is possible to prevent flooding by reducing the amount of condensed water produced in the cells and to improve the durability and deterioration of the fuel cell stack, thus improving the durability performance and output performance.

Meanwhile, a dummy cell 14 is stacked in a single layer between the closed end plate 22 and the working cell 12. The dummy cell 14 may be a non-reaction cell that does not generate electricity and is in direct contact with the inside wall of the closed end plate 22 at the rear end of the end cell among the working cells 12 to exhibit a heat-insulating function. In the present invention, a sub-gasket 20 having a closed plate structure without manifold flow holes is applied to the dummy cell 14 to maintain the air pocket formed in the flow space 30 of the closed end plate 22 even when there is a change in the flow of fuel supplied to the fuel cell stack 10. In other words, since the sub-gasket 20 from which typical manifold flow holes are eliminated is used as the sub-gasket for the dummy cell 14, it is possible to maintain the air pocket formed in the flow space 30, regardless of a change in the flow of fuel introduced through the inlet path 26 of the open end plate 24.

On the contrary, a sub-gasket which does include manifold flow holes may be used in other unit cells in the fuel cell stack 10, i.e., the working cells 12, and the manifold flow holes of the sub-gasket form a part of the supply manifold 16 and the discharge manifold 18.

Figure 4:
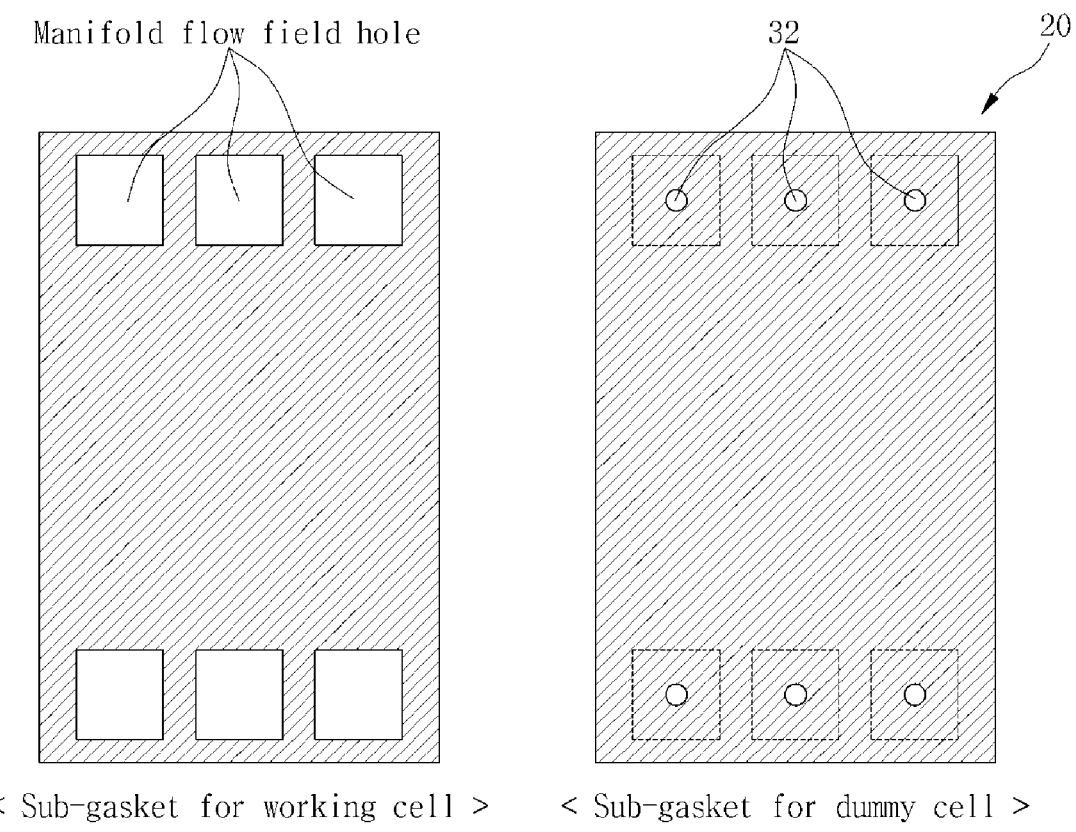
FIG. 4 is a view showing the structure of a sub-gasket applied to a working cell and a dummy cell, respectively, in a fuel cell stack according to an exemplary embodiment of the present invention.

In FIG. 4, the structure of a sub-gasket for the working cell 12 and the dummy cell 14, respectively, used in the exemplary embodiment of the present invention is shown. Referring to FIG. 4, the sub-gasket for the working cell 12 includes manifold flow holes, while the sub-gasket 20 for the dummy cell 14 includes micro-holes 32 instead of the manifold flow holes. Micro-holes 32 are significantly smaller in diameter than the standard manifold flow holes and thus have distinctly different flow properties. That is, in order to maintain the air pocket of the flow space 30 when there is a change in the flow of fuel in the fuel cell stack, the micro-holes 32 eliminate a differential pressures between the front and rear sides of the sub-gasket by being formed in the dummy cell 14, instead of the manifold flow holes being integrated into the sub-gasket.

More specifically, when the manifold flow holes are eliminated from the sub-gasket 20 for the dummy cell 14, a differential pressure is caused between the front and rear sides of the sub-gasket and, as shown in FIG. 4, the micro-holes 32 formed in the sub-gasket 20, instead of the manifold flow holes, can eliminate the differential pressure caused between the front and rear sides of the sub-gasket. Like the manifold flow holes, the micro-holes 32 (i.e., holes smaller than 5 mm) are formed in the sub-gasket 20 to be located on the straight lines of the supply manifold 16 and the discharge manifold 18 and, as shown in FIG. 2, located in positions facing the ends of the supply manifold 16 and the discharge manifold 18. Accordingly, the micro-holes 32 are located between the flow space 30 of the closed end plate 22 and the end of the supply manifold 16.

Figure 5:
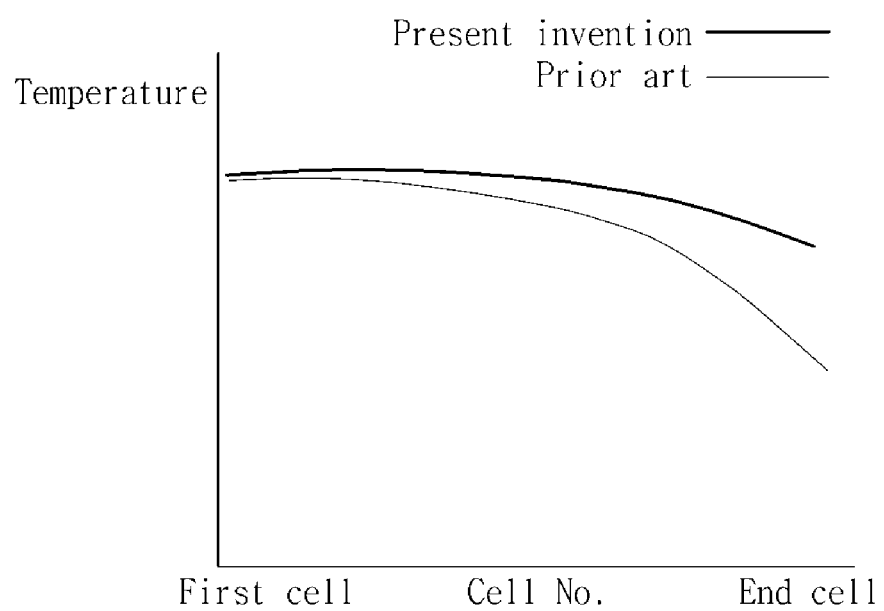
FIG. 5 is a graph showing the results of temperature distribution analysis on a fuel cell stack according to an exemplary embodiment of the present invention and a conventional fuel cell stack.

FIG. 5 is a graph showing the results of temperature distribution analysis on a fuel cell stack according to the exemplary embodiment of the present invention and a conventional fuel cell stack. As shown in FIG. 5, it can be seen that, in the present invention, the temperature of the working cell adjacent to the closed end plate, i.e., the end cell is higher than that of the conventional one, and the temperature of the working cell adjacent to the closed end plate other than the end cell is also increased compared to the convention one. In other words, the temperature of most working cells, which constitute the fuel cell stack, is higher than that of the conventional one. In particular, the largest temperature difference occurs in the end cell adjacent to the closed end plate, and the temperature difference gradually decreases from the end cell to the first cell, but the temperature of most working cells is higher than that of conventional one.

As described above, the present invention provided the following effects.

1. Since the flow space as a structure for preventing cooling of a neighbor cell adjacent to the closed end plate is formed on the inside wall of the closed end plate to cause an increase in temperature of the neighbor cell due to an air pocket effect caused by the flow space, it is possible to prevent flooding by reducing the amount of condensed water produced in the cells and to improve the durability and deterioration of the fuel cell stack, thus improving the durability performance and output performance.

2. It is possible to prevent cooling of the cell adjacent to the closed end plate without the additional use of the dummy cell, and thus it is possible to solve the problems such as a reduction in output, an increase in manufacturing cost, an increase in weight, etc. due to the additional use of the dummy cell.

3. It is not necessary to use a heat-insulating material or heating wire to increase temperature of the cells, and thus there are no increases in the manufacturing cost and weight.

The invention has been described in detail with reference to exemplary embodiments thereof. However, it will be appreciated by those skilled in the art that changes may be made in these embodiments without departing from the principles and spirit of the invention, the scope of which is defined in the appended claims and their equivalents.

What is claimed is:

1. A fuel cell stack that prevents deterioration of an end cell, the fuel cell stack comprising:

an open end plate disposed on a first side of the fuel cell stack; and a closed end plate disposed on a second side of the fuel cell stack, the open end plate and the closed end plate in combination fastening together a plurality of working cells, wherein a hollow flow space is formed on an inside wall of the closed end plate adjacent to a working cell, wherein the closed end plate and the working cell are adjacent to each other with a dummy cell interposed therebetween and a sub-gasket for the dummy cell has a closed plate structure including micro-holes, wherein the micro-holes are smaller than manifold flow holes, and wherein the sub-gasket having a closed plate structure without the manifold flow holes is applied to the dummy cell to maintain an air pocket formed in the hollow flow space of the closed end plate.

2. The fuel cell stack of claim 1, wherein the flow space is formed in a position facing an end of a supply manifold adjacent to the closed end plate.

3. The fuel cell stack of claim 1, wherein the micro-holes are formed in the sub-gasket in positions facing the end of the supply manifold and an end of a discharge manifold adjacent to the closed end plate, respectively.

* * * * *